(12) United States Patent
Walter et al.

(10) Patent No.: US 11,841,324 B2
(45) Date of Patent: Dec. 12, 2023

(54) METHOD AND DEVICE FOR ESTIMATING A STED RESOLUTION

(71) Applicant: Leica Microsystems CMS GmbH, Wetzlar (DE)

(72) Inventors: Kai Walter, Schriesheim (DE); Lars Friedrich, Weinheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 429 days.

(21) Appl. No.: 17/211,924

(22) Filed: Mar. 25, 2021

(65) Prior Publication Data

US 2021/0302316 A1 Sep. 30, 2021

(30) Foreign Application Priority Data

Mar. 27, 2020 (EP) .................................... 20166359

(51) Int. Cl.
*G01N 21/64* (2006.01)
*G02B 21/00* (2006.01)
*G02B 21/36* (2006.01)

(52) U.S. Cl.
CPC ..... *G01N 21/6458* (2013.01); *G02B 21/0076* (2013.01); *G02B 21/367* (2013.01)

(58) Field of Classification Search
CPC .... G01N 21/64; G01N 21/6458; G02B 21/00; G02B 21/16; G02B 21/0076;
(Continued)

(56) References Cited

U.S. PATENT DOCUMENTS 5,731,588 A 3/1998 Hell et al.
8,314,406 B2 * 11/2012 Ntziachristos ..... G01N 21/6456
250/458.1
(Continued)

FOREIGN PATENT DOCUMENTS

WO WO 2019169368 A1 9/2019

OTHER PUBLICATIONS

Shan, Qi, Jiaya Jia, and Aseem Agarwala. "High-quality motion deblurring from a single image." Acm transactions on graphics (tog) 27.3 (2008): 1-10. (Year: 2008).*
(Continued)

*Primary Examiner* — Edward F Urban
*Assistant Examiner* — Benedict E Lee
(74) *Attorney, Agent, or Firm* — Leydig, Voit & Mayer, Ltd.

(57) ABSTRACT

A method for estimating a stimulated emission depletion microscopy (STED) resolution includes generating a first frame representing a reference image from a field-of-view, the reference image having a predetermined reference resolution, and generating at least one second frame representing a STED image from the same field-of-view, the STED image having the STED resolution to be estimated. The at least one second frame is blurred by applying a convolution kernel with at least one fit parameter to the second frame. An optimal value of the at least one fit parameter of the convolution kernel is determined for which a difference between the first frame and the blurred at least one second frame is minimized. The STED resolution is estimated based on the optimal value of the at least one fit parameter and the predetermined reference resolution.

16 Claims, 9 Drawing Sheets

(58) Field of Classification Search
CPC .... G02B 21/36; G02B 21/367; G02B 21/365;
G02B 21/361; G02B 21/362; G06T 7/00;
G06T 7/0004; G06T 2207/10056; G06T
2207/30024; G06T 2207/30168
See application file for complete search history.

(56) References Cited

U.S. PATENT DOCUMENTS

| | | | | |
|---|---|---|---|---|
| 9,651,493 | B2* | 5/2017 | Goodwin | G01N 21/6458 |
| 10,346,740 | B2* | 7/2019 | Zhang | G06V 10/764 |
| 10,908,088 | B2* | 2/2021 | Voleti | G02B 21/0076 |
| 11,049,221 | B2* | 6/2021 | Tamal | G06T 5/002 |
| 11,222,415 | B2* | 1/2022 | Ozcan | G06N 3/048 |
| 11,488,622 | B2* | 11/2022 | Rogers | G16Y 20/10 |
| 2011/0025831 | A1* | 2/2011 | Bewersdorf | G02B 21/361 348/50 |
| 2016/0117800 | A1 | 4/2016 | Korkin | |
| 2017/0104926 | A1 | 4/2017 | Kim | |
| 2019/0169368 | A1 | 6/2019 | Van Der Mee et al. | |
| 2022/0066187 | A1* | 3/2022 | Polzer | G02B 21/0076 |
| 2022/0187584 | A1* | 6/2022 | Ha | G02B 21/367 |

OTHER PUBLICATIONS

Koho, Sami et al., "Fourier ring correlation simplifies image restoration in fluorescence microscopy," Nat Commun 10, 3103, Jul. 15, 2019, pp. 1-9, Nature Publishing Group, UK.

Rooms F. et al: "PSF Estimation With Applications in Autofocus and Image Restoration", Proceedings of the IEEE Benelux Signal Processing Symposium, Leuven, Belgium, Mar. 21, 2002 (Mar. 21, 2002), pp. 13-16, XP002367022.

Fabian Goettfert, et al.: "Coaligned Dual-Channel STED Nanoscopy and Molecular Diffusion Analysis at 20 nm Resolution", p. Biophysical Journal, ,ed.: Paul Wiseman, Jul. 1, 2013, Amsterdam (NL), pp. L01-L03 & 1-11, vol. 105, XP055343969, ISSN: 0006-3495, DOI: 10.1016/j.bpj.2013.05.029.

* cited by examiner

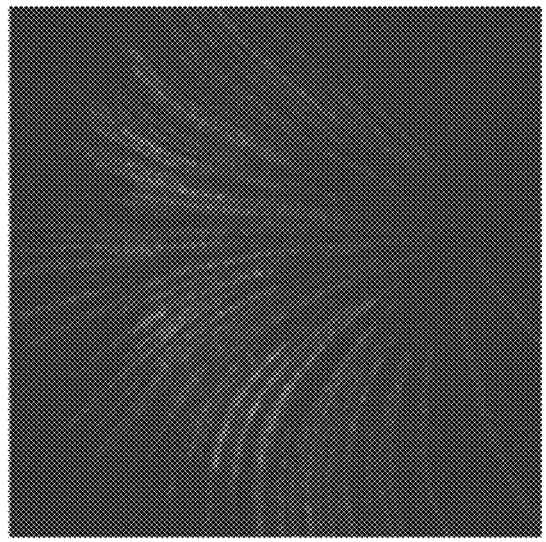
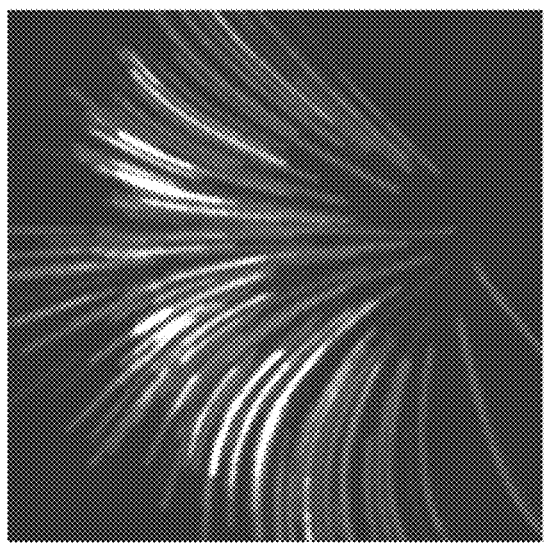
Fig. 3

METHOD AND DEVICE FOR ESTIMATING A STED RESOLUTION

CROSS-REFERENCE TO PRIOR APPLICATIONS

Priority is claimed to European Patent Application No. EP 20166359.8, filed on Mar. 27, 2020, the entire disclosure of which is hereby incorporated by reference herein.

FIELD

The present invention relates to a method and a device for estimating a stimulated emission depletion microscopy (STED) resolution.

BACKGROUND

STED is a fluorescence microscopy technique that allows to overcome the diffraction limited optical resolution of other techniques as e.g. confocal microscopy. The enhancement of resolution is achieved by switching off the fluorescence of the fluorophores by stimulated emission using high-intensity laser light in outer regions of a diffraction limited excitation focus. The intense laser light causes almost all of the excited fluorophores to return to a non-fluorescent ground state. Fluorescence from the remaining excited fluorophores in the center of the excitation focus is then detected for creating high resolution images. The principles of STED microscopy technique are explained in detail e.g. in U.S. Pat. No. 5,731,588.

Compared to wide field or confocal microscopy, where the optical resolution depends only on the optical parameters of the optical system used for imaging the sample, the optical resolution in STED in particular depends on the photo-physical properties of the fluorophores and their environment. Therefore, in contrast to wide field or confocal microscopy, an estimation of the STED resolution is very difficult. Essentially, in real STED experiments, a user does not have any information about the STED resolution. As an information about the resolution is needed for reconstructing an image by means of deconvolution, it is highly desirable to find a way for measuring and/or estimating the STED resolution.

In a wider context, a method called Fourier ring correlation (FRC) is known in the art. FRC measures the normalized cross-correlation in Fourier space, i.e. as a function of spatial frequency. In case that the sample to be imaged does not have any sharp contours, the spatial frequency is low, and FRC is not suitably applicable. Accordingly, FRC results cannot be used for deconvolution. Further, FRC is strongly noise-dependent so that the calculation fails for low signal-to-noise (SNR) images. Interestingly, FRC calculation is also wrong for especially good SNR (roughly SNR<50), and the FRC-measure converges to zero when the SNR goes towards infinity. FRC is described in Koho, S.; Tortarolo, G.; Castello, M.; Deguchi, T.; Diaspro, A. & Vicidomini, G., Fourier ring correlation simplifies image restoration in fluorescence microscopy, Nat Comm, 2018.

SUMMARY

In an embodiment, the present invention provides a method for estimating a stimulated emission depletion microscopy (STED) resolution. The method includes generating a first frame representing a reference image from a field-of-view, the reference image having a predetermined reference resolution, and generating at least one second frame representing a STED image from the same field-of-view, the STED image having the STED resolution to be estimated. The at least one second frame is blurred by applying a convolution kernel with at least one fit parameter to the second frame. An optimal value of the at least one fit parameter of the convolution kernel is determined for which a difference between the first frame and the blurred at least one second frame is minimized. The STED resolution is estimated based on the optimal value of the at least one fit parameter and the predetermined reference resolution.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following:

FIG. 3 shows a simulated confocal image and a simulated STED image,

DETAILED DESCRIPTION

Figure 1:
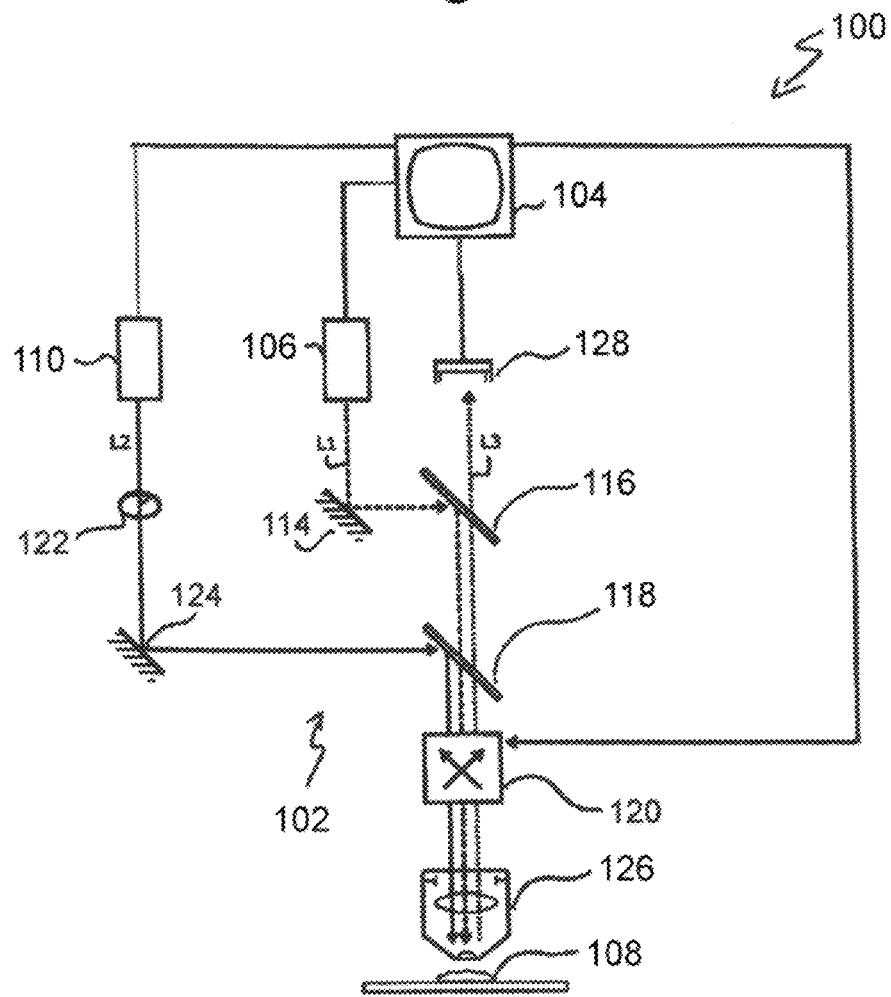
FIG. 1 is a schematic diagram of a fluorescence microscope according to an embodiment.

Embodiments of the present invention provide a method and a device which are suitable for reliably estimating a STED resolution.

According to an embodiment, a method for estimating a STED resolution is provided, comprising the following steps: generating a first frame representing a reference image from a field-of-view, said reference image having a predetermined reference resolution; generating at least one second frame representing a STED image from the same field-of-view, said STED image having the STED resolution to be estimated; blurring the second frame by applying a convolution kernel with at least one first parameter to the second frame; determining an optimal value of the fit parameter of the convolution kernel for which a difference between the first frame and the blurred second frame is minimized; and estimating the STED resolution based on the optimal value of the fit parameter and the predetermined reference resolution.

Preferably, the reference image is a confocal image, and the predetermined reference resolution is a predetermined confocal resolution.

In a preferred embodiment, the STED resolution is determined based on a difference between the predetermined reference resolution and the optimal value of the fit parameter. Alternatively, the STED resolution is determined based on a difference between the square of the predetermined reference resolution and the square of the optimal value of the fit parameter.

The convolution kernel may be represented by a Gaussian kernel or by a kernel based on a spherical Bessel function or by a kernel based on an Airy function, with a width representing the fit parameter.

Preferably, the predetermined reference resolution depends only on optical parameters of an optical system used for generating the reference image.

A signal-to-noise ratio may be determined from the second frame, and the STED resolution may be corrected dependent on the signal-to-noise ratio.

In an advantageous embodiment, a plurality of down-sampled frames is generated from one second frame, said down-sampled frames having different signal-to-noise ratios which are derived from the signal-to-noise ratio of the second frame. The step of estimating the STED resolution may be performed for each of the plurality of down-sampled frames, and a signal-to-noise corrected STED resolution may be determined based on the plurality of STED resolutions estimated for the plurality of down-sampled frames.

In a preferred embodiment, the at least one second frame comprises a plurality of second frames, wherein the steps of blurring, determining an optimal value of the fit parameter and estimating the STED resolution are performed for each of said plurality of second frames. Then, a final STED resolution is determined based on the plurality of estimated STED resolutions.

According to a preferred embodiment, a STED point spread function (PSF) is determined based on the estimated STED resolution.

Preferably, a deconvolution is performed on the first frame representing the reference image based on a reference point spread function and/or on the at least one second frame representing the STED image based on a STED point spread function.

In a preferred embodiment, the first frame and the at least one second frame are generated from a single image acquisition.

The image acquisition may be performed by applying time-gated detection sorting photons depending on their arrival times on a light detector.

A continuous wave laser or a pulsed laser may be used for emitting a depletion light when generating the second frame.

A pulsed laser may be used for emitting excitation light when generating the first frame.

According to another embodiment, a device for estimating a STED resolution is provided. The device comprises an imaging unit, or imager, configured to generate a first frame representing a reference image from a field-of-view, said reference image having a predetermined reference resolution, and to generate at least one second frame representing a STED image from the same field-of-view, said STED image having the STED resolution to be estimated. The device further comprises a processor which is configured to blur the second frame by applying a convolution kernel with at least one fit parameter to the second frame. The processor is further configured to determine an optimal value of the fit parameter of the convolution kernel for which a difference between the first frame and the blurred second frame is minimized. The processor is further configured to estimate the STED resolution based on the optimal value of the fit parameter and the predetermined reference resolution.

The device is preferably adapted to carry out the method according to an embodiment. Furthermore, a computer program with a program code for performing the method according to an embodiment is provided, when the computer program is run on a processor.

FIG. 1 shows a schematic diagram of a fluorescence microscope 100 according to an embodiment. The fluorescence microscope 100 is configured to estimate a STED resolution as explained in detail hereinafter. At first, the basic structure of the fluorescence microscope 100 will be briefly outlined.

The fluorescence microscope 100 comprises an imaging unit commonly referred to as 102 in FIG. 1 and a processor 104 which may be configured to control the overall operation of the fluorescence microscope 100.

The imaging unit 102 comprises an excitation light source 106 which serves to emit excitation light L1 which is suitable to excite fluorophores present in an excitation focus within the sample 108 to spontaneously emit fluorescent light L3. The wavelength of the excitation light L1 is adapted to the fluorophores used in the specific experiment. The imaging unit 102 further comprises a depletion light source 110 which serves to emit depletion light L2 which is suitable to deplete outer regions of the excitation focus created by the excitation light L1. The wavelength of the depletion light L2 is selected such that the fluorophores present in the sample 108 are reliably induced to return from their excited state to the ground state by stimulated emission when irradiated with the depletion light L2. Specifically, the depletion light L2 may have a wavelength approximately equal to the wavelength of the fluorescent light L3 emitted by the fluorophores upon transition from the excited state to the ground state.

The excitation light source 106 emits the excitation light L1 onto a mirror 114 which reflects the excitation light L1 onto a first wavelength-selective beam splitter 116. The beam splitter 116 reflects the excitation light L1 onto a second wavelength selective beam splitter 118 transmitting the excitation light L1 towards a scan device 120.

The depletion light source 110 emits the depletion light L2 onto a phase mask 122 which influences the excitation light L2 in such a way that—in the region of the excitation focus—a spatial distribution thereof exhibits a minimum, preferably a zero, and rises steeply from the minimum. After passing through the phase mask 122, the depletion light L2 is reflected at a mirror 124 onto the second wavelength-selective beam splitter 118 from which the depletion light L2 is reflected towards the scan device 120.

The scan device 120 is configured to move the excitation light L1 and the depletion light L2, which are superimposed by the beam splitter 118, towards an objective 126 which focuses the superimposed light distribution L1/L2 into the sample 108. By operating the scanning device 120, the superimposed light distribution L1/L2 is moved over the sample 108 so that a plurality of points within the sample 108 is scanned with the superimposed light distribution L1/L2.

The sample 108 illuminated with the superimposed light distribution L1/L2 emits the fluorescent light L3 which is returned to the scanning device 120 through the objective 126. Accordingly, the exemplary configuration of FIG. 1 provides for a so-called descanned detection of the fluorescent light L3. Subsequently, the fluorescent light L3 passes the beam splitters 118, 116 and falls onto a detector 128.

Needless to say that the beam splitters 116, 118 exhibit spectral characteristics adapted to the wavelengths of the excitation light L1, the depletion light L2, and the fluorescent L3 in order to enable light guidance by reflection and transmission as illustrated in FIG. 1.

The detector 128 may be configured to perform image acquisition by detecting the intensity of the fluorescence light. Alternatively or additionally, the detector 128 may be configured to perform image acquisition by applying time-gated detection on the fluorescence photons representing the fluorescent light L3 emitted from the sample 108. Thus, under control of the processor 104, the detector 128 detects and sorts the fluorescence photons dependent on their arrival times on the detector 128. For instance, the detector 128 is configured to detect the arrival times by applying time-correlated single photon counting. For this, the detector 128 detects the arrival times of the fluorescence photons in relation to a start time which may be defined by a light pulse emitted by one of the excitation and depletion light sources 106, 110.

In the specific example shown in FIG. 1, it may be assumed that both the excitation light source 106 and the depletion light source 110 are formed by pulsed laser sources. However, this configuration is merely an example. For instance, according to an alternative embodiment, the depletion light source 110 may be configured as a continuous wave (CW) laser emitting the depletion light L2.

Figure 2:
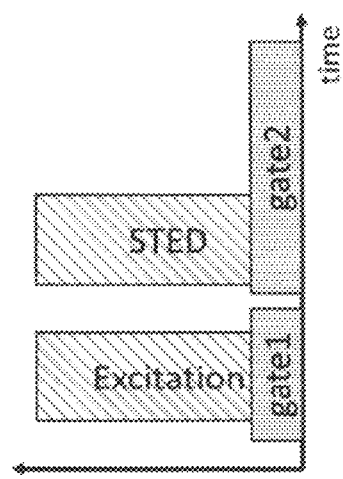
FIG. 2 is a schematic diagram illustrating time gated detection.

FIG. 2 is a schematic diagram illustrating time-gated detection executed by the detector 128 under control of the processor 104 in a case where both the excitation light source 106 and the depletion light source 110 are pulsed laser sources. According to FIG. 2, the excitation light source 106 outputs an excitation pulse having a pulse duration of P1 during a detection time gate TG1. Subsequently, the depletion light source 110 outputs a depletion pulse DP having a pulse duration P2 during a detection time gate TG2. As can be seen in FIG. 2, the excitation pulse EP and the depletion pulse DP do not overlap temporarily. By applying the two separated detection time gates TG1 and TG2, the detector 128 allows to generate a first frame representing a pure confocal image and a second frame representing a pure STED image. In FIG. 3, a simulated confocal image is shown on the left side, and a simulated STED image is shown on the right side. As explained in detail below, the first frame representing the confocal image and the second frame representing the STED image can be used for estimating the STED resolution. In this respect, it is to be noted that the first frame is not limited to a confocal image. Rather, any frame may be used to represent a reference image provided that this reference image has a resolution which may be determined in advance to be used as a reference for estimating the unknown STED resolution.

Hereinafter, a method for estimating the STED resolution according to an embodiment will be explained. In this embodiment, only one STED frame is used to determine the resolution thereof. However, as will be shown below, the method may also be applied to multiple STED frames created, e.g. by applying multiple detection time gates following the excitation pulse.

Figure 4:
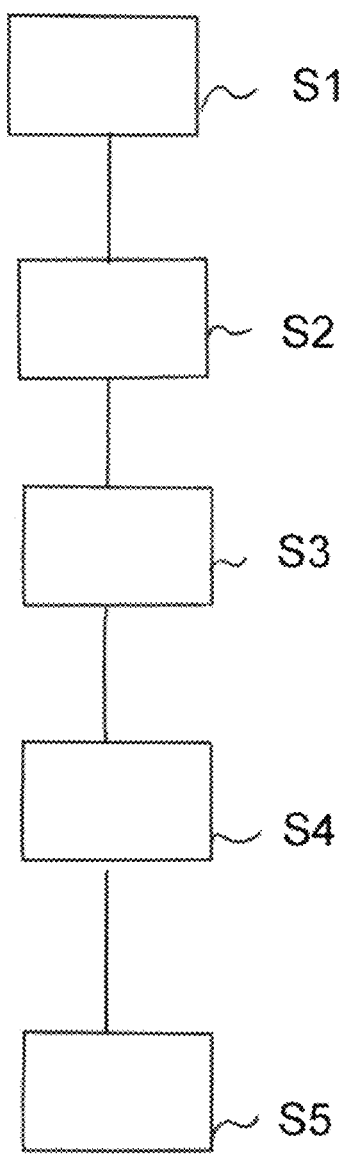
FIG. 4 is a flow diagram illustrating a method for estimating a STED resolution.

FIG. 4 shows a flow diagram illustrating the method steps which are executed for estimating the STED resolution according to the embodiment.

In step S1, a first frame representing a reference image from a field-of-view is generated, e.g. by an image acquisition applying the detection time gate TG1. As noted above, the reference image may be a confocal image without being limited thereto. In any case, the reference image has a specific reference resolution which can be determined in advance. For instance, the resolution of the reference image may depend only on optical parameters of an optical system which is used for generating the reference image. According to the exemplary configuration of FIG. 1, the afore-mentioned optical system may be formed by the objective 126 collecting the fluorescence light L3 from the sample 108. Accordingly, the reference resolution may be determined in advance based on the optical parameters of the objective 126.

In step S2, at least one second frame representing a STED image is generated from the same field-of-view, e.g. by an image acquisition applying the detection time gate TG2, wherein the STED image has a STED resolution which is to be estimated by the method. The order of performing steps S1 and S2 is of no particular relevance and might be reversed.

In step S3, the second frame representing the STED image is blurred by applying a convolution kernel to the second frame. The convolution kernel includes at least one fit parameter which is explained in more detail below.

In step S4, an optimal value of the fit parameter of the convolution kernel is determined, wherein the optimal value minimizes a difference between the first frame and the second frame which is blurred by means of the convolution kernel including the fit parameter.

Finally, in step S5, the STED resolution is estimated based on the optimal value of the fit parameter, which had been determined in step S4, and based the predetermined reference resolution known in advance.

In the following, a specific implementation of the general method of FIG. 4 is explained.

First, a suitable convolution kernel applied in step S3 of FIG. 4 is explained in more detail. In this example, a two dimensional (x,y) Gaussian blurring kernel $f_\Delta$ is represented by equation (1):

$$f_\Delta = \alpha \exp\left[-\frac{1}{2}\frac{x^2+y^2}{\sigma_\Delta^2}\right] + \beta. \tag{1}$$

In step S3, the second frame representing the STED image ($F_1$) is blurred with the Gaussian blurring kernel $f_\Delta$ defined in equation (1). Accordingly, the blurred second frame created in step S3 is given by $f_\Delta * F$ when the unblurred second frame is designated by $F_1$. Preferably, blurring of the second frame representing the STED image ($F_1$) is achieved by performing a convolution as indicated above by symbol "*".

The Gaussian blurring kernel defined in equation (1) comprises three unknown parameters $\alpha$, $\beta$, and $\sigma_\Delta$. In order to minimize a difference between the first (confocal) frame (designated by $F_0$) and the blurred second (STED) frame $f_\Delta * F_1$, the following minimization problem according to equation (2) is considered:

$$\alpha, \beta, \sigma_\Delta = \mathrm{argmin}_{\hat\alpha,\hat\beta,\hat\sigma_\Delta}[\|F_0 - f_\Delta(\hat\alpha, \hat\beta, \widehat{\sigma_\Delta}) * F_1\|^2]. \tag{2}$$

By solving the minimization problem according to equation (2), a difference resolution $\sigma\Delta$ can be estimated. Assuming that the first frame $F_0$ is a pure confocal frame, the STED resolution is given by equation (3):

$$\sigma_{STED} = \sqrt{\sigma_{confocal}^2 - \sigma_\Delta^2} \tag{3}$$

In contrast to the STED resolution $\sigma_{STED}$, which depends on internal fluorophore properties, the confocal resolution represented by $\sigma_{confocal}$ depends only on the optical parameters of the optical system, i.e. on the optical parameters of the objective 124 in the embodiment of FIG. 1 and the wavelength of the excitation light. The confocal resolution $\sigma_{confocal}$ may be defined according to equation (4):

$$\sigma_{confocal} = \frac{0.44\lambda}{NA} \frac{1}{2\sqrt{2 \log 2}}. \tag{4}$$

In equation (4), $\lambda$ is the wavelength of the excitation light L1, and NA is the numerical aperture of the objective 126. The factor $2\sqrt{2\log 2} \approx 0.42$ is the conversion factor between the standard deviation of the Gaussian and the half width at half maximum (HWHM).

Accordingly, using equation (4), it is possible to estimate the STED resolution based only on the optical parameters of the optical system without considering any unknown internal fluorophore parameters.

Strictly speaking, equation (4) is only valid if both the confocal and STED point spread functions (PSF) are Gaussian. However, equation (4) can be used for typical real PSFs in good approximation.

In the example explained above, a two-dimensional case is considered for simplicity. However, extension to the three-dimensional (x,y,z) case is straight forward. In the three-dimensional case, a three-dimensional Gaussian kernel according to equation (5) may be considered:

$$f_\Delta = \alpha \exp\left[-\frac{1}{2}\frac{x^2+y^2}{\sigma_\Delta^2} - \frac{1}{2}\frac{z^2}{\sigma_{\Delta z}^2}\right] + \beta. \tag{5}$$

In equation (5), $\sigma_\Delta$ and $\sigma_{\Delta_z}$ are lateral and axial difference widths, respectively.

It is to be noted again that the two and three-dimensional Gaussian kernels according to equations (2) and (5), respectively, are merely examples of a suitable convolution kernel which is used to blur the second frame $F_1$. Other kernels may be used, for instance a kernel based on a spherical Bessel function or a kernel based on an Airy function. However, a Gaussian blurring kernel is preferred due to the small numerical effort required to determine an optimal value of the fit parameters of the kernel.

Figure 5:
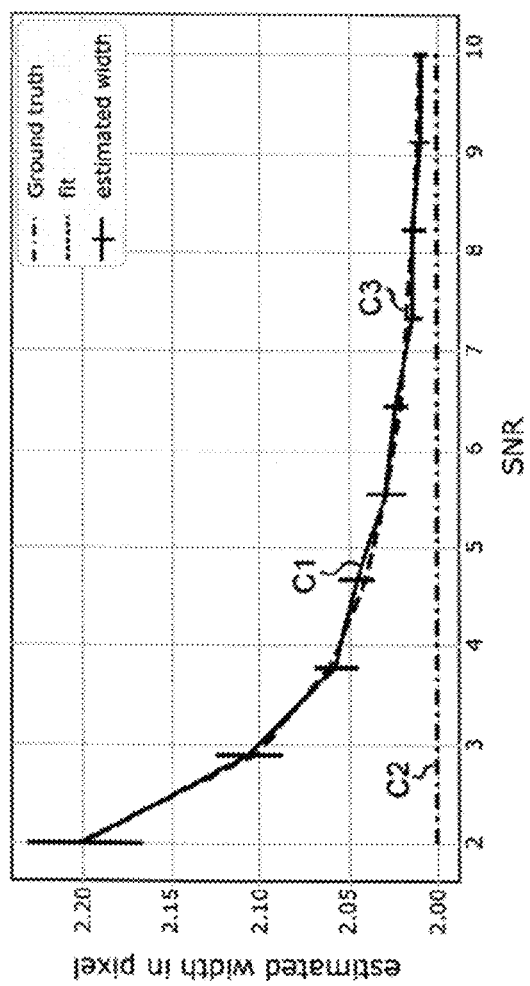
FIG. 5 is a diagram illustrating noise dependence of the estimation of STED resolution.

It is further to be noted that the difference resolution $\sigma_\Delta$ estimated based on equation (2) is significantly affected by noise. In order to illustrate the noise effect, FIG. 5 shows the results of a calculation simulating a confocal image with varying noise. Specifically, a curve C1 shows the difference width $\sigma_\Delta$, which is estimated based on equation (2), for different values of the signal-to-noise ratio SNR. The estimated difference width $\sigma_\Delta$ diverges for small SNR values from the expected width represented by a line C2 indicating the ground truth width. A precise estimation is only possible in the limit of large SNR values. However, STED images are often very noisy. In addition, the noise dependency of the estimation strongly depends on the image content which makes a systematic analysis difficult.

In order to solve the noise problem, the inventors carried out some theoretical analysis of the minimization problem according to equation (2). Based on suitable approximations, the minimization regarding the difference width can be solved. The approximated solution is given by equation (6):

$$\sigma_\Delta = \sigma_{GT} + \frac{\beta_1}{SNR^2 + \beta_2}. \tag{6}$$

In equation (6), unknown constants $\beta_1$ and $\beta_2$ are parameters which depend on the image content and are not accessible in a real experiment. The signal-to-noise-ratio SNR may be defined as the square root of the mean photon count of the STED image according to equation (7):

$$SNR = \sqrt{\Sigma_{pixels} F_1 / \text{numberofpixels}}. \tag{7}$$

As expected, equation (6) converges to the ground truth $\sigma$GT in the limit of large SNR values, as can be seen in FIG. 5. If multiple STED acquisitions from the same field-of-view with different noise levels are available, the three unknown parameters $\beta_1$, $\beta_2$, $\sigma_{GT}$ can be estimated/calculated by means of a curve fit as shown in curve $C_3$ in FIG. 5. However, such a multi-exposure acquisition cannot easily be executed in a real experiment. For instance, photo toxicity or movement of the biological samples to be imaged prevent a qualitative comparison of different acquisitions. Therefore, hereinafter a method is proposed which enables to estimate the unknown parameters $\beta_1$, $\beta_2$, $\beta_{GT}$ from a single confocal frame and a single STED frame.

Figure 6:
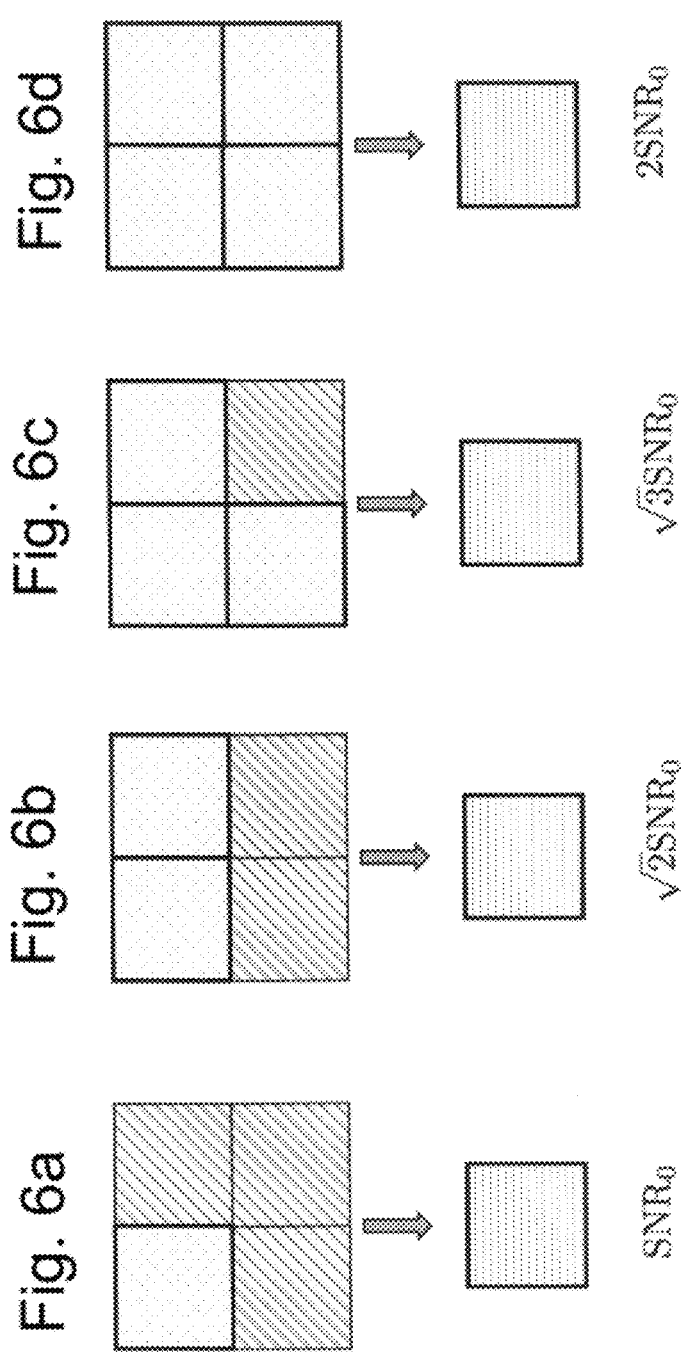
FIGS. 6a-6d are a diagram illustrating a noise correction process.

In order to estimate the fit parameters $\beta_1$, $\beta_2$, and $\beta_{GT}$, at least three input points are needed. For providing these input points, down-sampling of the STED frame is applied. For instance, down-sampling with a factor 2 may be used to create four frames with different SNR values from the original frame, as illustrated in FIG. 6. For this, a binning process may be applied in which neighboring pixels of a frame are combined to pixel blocks enhancing the signal-to-noise ratio.

For instance, by picking one pixel (depicted as dotted area in FIG. 6a) from a 2×2 pixel configuration, a first down-sampled pixel with the same signal-to-noise ratio $SNR_0$ as the original STED frame is created (depicted as horizontally hatched area in FIG. 6a). Then, by combining two neighboring pixels, a second down-sampled pixel is created with a times higher SNR is created (see FIG. 6b). In the same way, third and fourth down-sampled pixels are created. As a result, four down-sampled frames $F_{11}$, $F_{12}$, $F_{13}$, $F_{14}$ with SNR values $SNR_0$, $\sqrt{2}SNR_0$, $\sqrt{3}SNR_0$, and $2SNR_0$ may be generated (see FIGS. 6a, 6b, 6c and 6d, respectively). Further, the confocal frame is down-sampled by binning to create a down-sampled confocal frame $F_0'$ having the signal-to-noise ratio $2SNR_0$.

Based on the down-sampled confocal frame and the four down-sampled STED frames, four estimations for different SNR values can be carried out according to equation (8):

$$\underline{\sigma} = [\sigma_{\Delta,1}, \sigma_{\Delta,2}, \sigma_{\Delta,3}, \sigma_{\Delta,4}]. \tag{8}$$

A noise-corrected estimation of the width can be obtained by means of a least squares minimization according to equation (9):

$$[\eta_0, \eta_1, \eta_2] = \operatorname{argmin}_{\tilde\eta_0,\tilde\eta_1,\tilde\eta_2}[\|\zeta([1, \sqrt{2}, \sqrt{3}, 2]) - \underline{\sigma}\|^2], \tag{9}$$

with $\zeta(x) = \eta_0 + \eta_1/(x+\eta_2)$, $\eta_1 = \beta_1/SNR_0$ and $\eta_2 = \beta_2/SNR_0$. The noise corrected difference resolution is then given by $\sigma_{\Delta,corr} = \eta_0$.

Accordingly, the estimation of the STED resolution is performed for each of the plurality of down-sampled frames, and the SNR corrected STED resolution is determined based on the plurality of STED resolutions estimated for all down-sampled frames.

Figure 7:
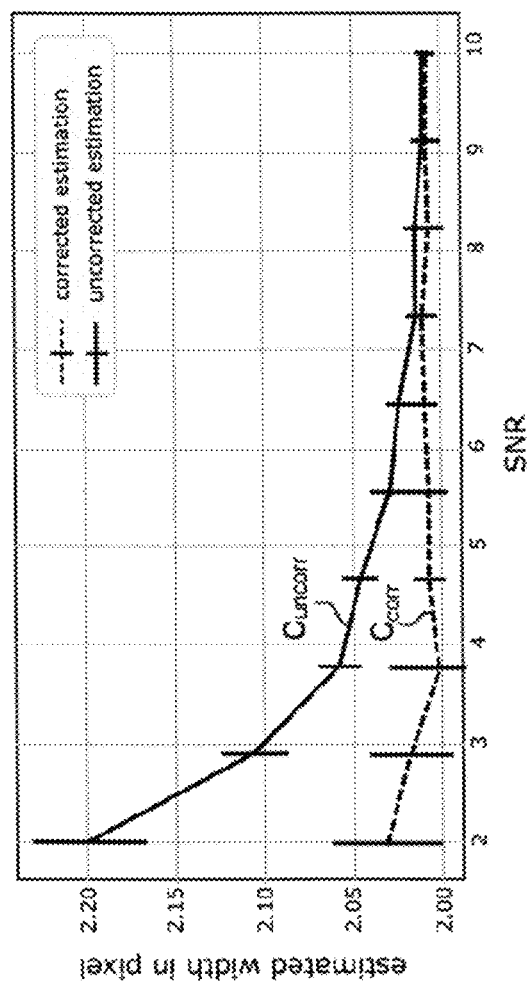
FIG. 7 is a diagram illustrating the effect of noise correction on the estimation of the STED resolution.

After the correction, the noise dependence of the estimation becomes very small as illustrated in FIG. 7 comparing the corrected estimation and the uncorrected estimation for the difference width $\sigma_\Delta$. In FIG. 7, a curve $C_{uncorr}$ illustrates the uncorrected estimation, and a curve $C_{corr}$ illustrates the corrected estimation.

A suitable way to simulate the STED point spread function $f$ based on the estimated resolution is to assume a Gaussian PSF according to equation (10):

$$f = \frac{1}{2\pi\sigma_{STED}^2} \exp\left(-\frac{1}{2}\frac{x^2 + y^2}{\sigma_{STED}^2}\right). \quad (10)$$

Although the approximation according to equation (10) is considered to be a good approximation, more complex PSF models can also be employed. For instance, a two-level model of fluorophores may be applied. In such a case, two unknown parameters must be estimated, namely a saturation factor $\zeta$ and the lifetime $\tau$ of the fluorophore. The saturation factor $\zeta$ can directly be calculated from the confocal resolution and the STED resolution based on equation (11):

$$\zeta = \left(\frac{\sigma_{STED}}{\sigma_{confocal}}\right)^2 - 1. \quad (11)$$

The lifetime $\tau$ of the fluorophore may be determined e.g. by means of fluorescence lifetime imaging microscopy (FLIM).

Figure 8A:
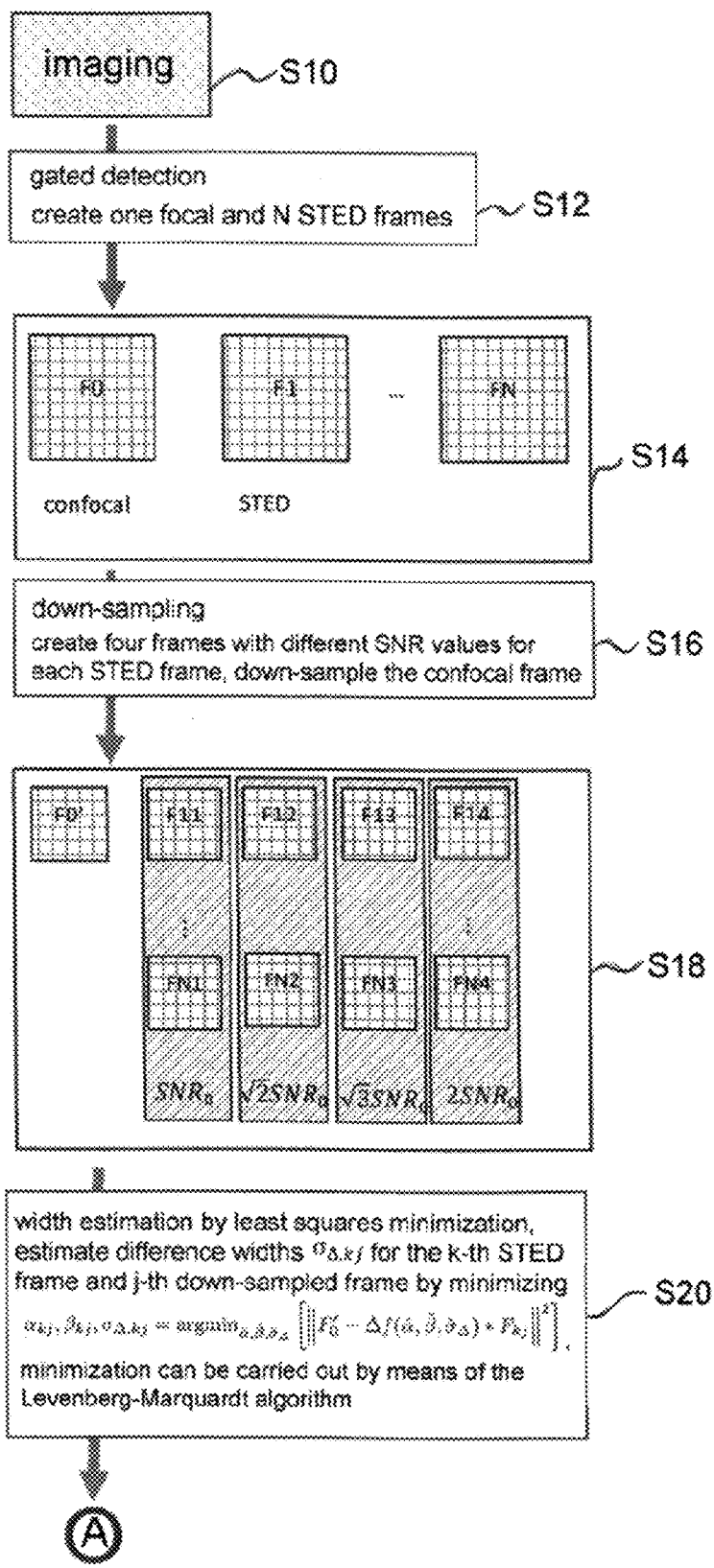
FIGS. 8a and 8b are a flow diagram illustrating an embodiment of the method considering a plurality of STED frames.
Figure 8B:
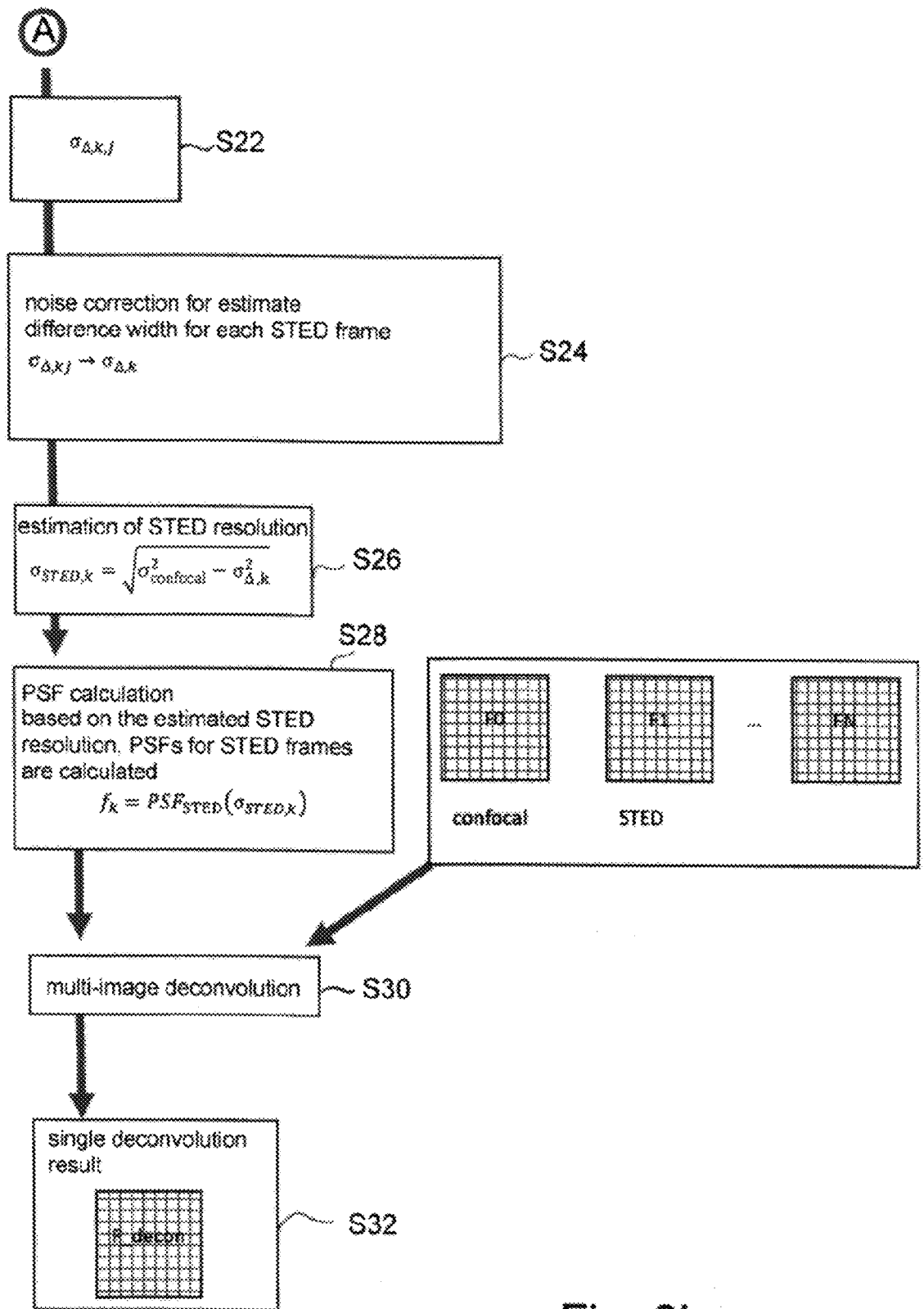

FIG. 8 (bridging from FIG. 8a to FIG. 8b) shows a flow diagram illustrating a specific implementation of the method including inter alia the noise correction described above. However, whereas the explanations above refer to an example where both the excitation light source 106 and the depletion light source 110 are formed by pulsed laser sources, the embodiment of FIG. 8 may be modified to be advantageously applicable in a case where the depletion light source 110 is a CW laser emitting the depletion light L2 continuously rather than in form of light pulses. By using CW laser depletion, the method may be applied to multiple STED frames which are created by means of time gated detection which uses multiple time gates following an excitation pulse emitted by the excitation light source 106.

The method illustrated in FIG. 8 starts in step S10 in which the fluorescence microscope is activated for imaging. In step S12, a first frame representing e.g. a confocal image as well as a number N of STED frames are generated from the same field-of-view. In this specific example, the confocal frame may be a frame which is detected shortly after an excitation pulse has been applied to the sample. Such a frame is not yet substantially affected by the depletion light and can therefore be regarded to represent a confocal image. In step S14, the confocal frame and the N STED frames are stored in a memory, wherein the confocal frame is designated by F0 and the STED frames are designated by F1 to FN in FIG. 8.

In step S16, the confocal frame F0 and each of the STED frames F1 to FN are down-sampled. Specifically, the down-sampling process explained above with reference to FIG. 6 is applied to each of the STED frames F1 to FN. For instance, by down-sampling the STED frame F1, a plurality of down-sampled frames F11 to F14 with signal-to-noise ratios $SNR_0$, $\sqrt{2}SNR_0$, $\sqrt{3}SNR_0$, and $2SNR_0$ is created. In the same way, down-sampled frames with different SNRs are obtained for the STED frames F2 to FN. It is to be noted that FIG. 8 shows by way of example a number of four down-sampled frames for each STED frame F1 to FN. However, more than four frames may be considered due to the number of possible combinations for selecting one or more pixels from a given ensemble of pixels. For example, there are 4 possibilities (choosing 1 from 4 possibilities) to select from $SNR_0$, there are 6 possibilities (choosing 2 from 4 possibilities) to select from $\sqrt{2}SNR_0$, there are 4 possibilities (choosing 3 from 4 possibilities) to select from $\sqrt{3}SNR_0$, and there is one possibility (choose all 4) to select from $2SNR_0$. In step S18, the down-sampled frames are stored in the memory.

In step S20, difference widths $\beta_{\Delta kj}$ are estimated for the k-th STED frame (k=1, . . . , N) and the j-th down-sampled frame by applying a least squares minimization based on equation (12):

$$\alpha_{kj}, \beta_{kj}, \sigma_{\Delta,kj} = \operatorname{argmin}_{\alpha,\beta,\sigma_\Delta}\left[\left\|F_0' - \Delta f(\hat{\alpha}, \hat{\beta}, \widehat{\sigma_\Delta}) * F_{kj}\right\|^2\right]. \quad (12)$$

The minimization may be carried out e.g. by means of the Levenberg-Marquardt algorithm. It is to be noted that equation (12) corresponds to equation (2) mentioned above for a case where only one STED frame is considered. The difference widths $\beta_{\Delta kj}$ are stored in step S22.

In step S24, the noise correction is performed for each STED frame F1 to FN based on the difference widths $\beta_{\Delta kj}$ as explained above with reference to equation (9). As a result, the difference width $\sigma_{\Delta k}$ for each STED frame is obtained.

In step S26, the STED resolution is estimated for each STED frame F1 to FN as explained above with reference to equation (3).

In step S28, a STED point spread function is calculated for each STED frame F1 to FN based on equation (10) assuming a Gaussian PSF.

In step S30, a multi-image deconvolution may be performed based on the PSFs determined for the plurality of STED frames F1 to FN.

Finally, in step S32, the results obtained by the multi-image deconvolution in step 30 may be merged to a single deconvolution result F_decon.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 fluorescence microscope
102 imaging unit
104 processor
106 excitation light source
108 sample
110 depletion light source
114, 124 mirror
116, 118 beam splitter
120 scan device
122 phase mask
126 objective
128 detector
L1 excitation light
L2 depletion light
L3 fluorescent light

What is claimed is:

1. A method for estimating a stimulated emission depletion microscopy (STED) resolution, the method comprising:
generating a first frame representing a reference image from a field-of-view, the reference image having a predetermined reference resolution,
generating at least one second frame representing a STED image from the same field-of-view, the STED image having the STED resolution to be estimated,
blurring the at least one second frame by applying a convolution kernel with at least one fit parameter to the second frame,
determining an optimal value of the at least one fit parameter of the convolution kernel for which a difference between the first frame and the blurred at least one second frame is minimized, and
estimating the STED resolution based on the optimal value of the at least one fit parameter and the predetermined reference resolution.

2. The method according to claim 1, wherein the reference image is a confocal image and wherein the predetermined reference resolution is a predetermined confocal resolution.

3. The method according to claim 1, wherein the STED resolution is determined based on a difference between the predetermined reference resolution and the optimal value of the at least one fit parameter, or wherein the STED resolution is determined based on a difference between a square of the predetermined reference resolution and a square of the optimal value of the at least one fit parameter.

4. The method according to claim 1, wherein the convolution kernel is represented by one of a Gaussian kernel, a kernel based on a spherical Bessel function or a kernel based on an Airy function, and wherein a width of the kernel represents the at least one fit parameter.

5. The method according to claim 1, wherein the predetermined reference resolution depends only on optical parameters of an optical system used for generating the reference image.

6. The method according to claim 1, wherein a signal-to-noise ratio is determined from the second frame, and wherein the STED resolution is corrected dependent on the signal-to-noise ratio.

7. The method according to claim 6, wherein a plurality of down-sampled frames are generated from one of the at least one second frame, the down-sampled frames having different signal-to-noise ratios which are derived from the signal-to-noise ratio of the second frame, wherein the step of estimating the STED resolution is performed for each of the plurality of down-sampled frames, and wherein a signal-to-noise corrected STED resolution is determined based on the plurality of STED resolutions estimated for the plurality of down-sampled frames.

8. The method according to claim 1, wherein the at least one second frame comprises a plurality of second frames, wherein the steps of blurring, determining an optimal value of the at least one fit parameter and estimating the STED resolution are performed for each of the plurality of second frames, and wherein a final STED resolution is determined based on the plurality of estimated STED resolutions.

9. The method according to claim 1, further comprising determining a STED point spread function based on the estimated STED resolution.

10. The method according to claim 9, further comprising performing a deconvolution on the first frame representing the reference image based on a reference point spread function and/or on the at least one second frame representing the STED image based on the STED spread point function.

11. The method according to claim 1, wherein the first frame and the at least one second frame are generated from a single image acquisition.

12. The method according to claim 11, wherein the image acquisition is performed by applying time-gated detection sorting photons depending on their arrival-times on a light detector.

13. The method according to claim 1, wherein a continuous wave laser or a pulsed laser is used for emitting depletion light in the step of generating the at least one second frame.

14. The method according to claim 1, wherein a pulsed laser is used for emitting excitation light in the step of generating the first frame.

15. A device for estimating a stimulated emission depletion microscopy (STED) resolution, the device comprising:
an imager configured to:
generate a first frame representing a reference image from a field-of-view, the reference image having a predetermined reference resolution, and
generate at least one second frame representing a STED image from the same field-of-view, the STED image having the STED resolution to be estimated, and
a processor configured to:
blur the second frame by applying a convolution kernel with at least one fit parameter to the second frame,
determine an optimal value of the at least one fit parameter of the convolution kernel for which a difference between the first frame and the blurred second frame is minimized, and
estimate the STED resolution based on the optimal value of the at least one fit parameter and the predetermined reference resolution.

16. A tangible, non-transitory computer-readable medium having instructions thereon which, upon execution by one or more computer processors, causes execution of method according to claim 1.

* * * * *